United States Patent [19]
Heil et al.

[11] Patent Number: 5,418,914
[45] Date of Patent: May 23, 1995

[54] RETRY SCHEME FOR CONTROLLING TRANSACTIONS BETWEEN TWO BUSSES

[75] Inventors: Thomas F. Heil, Easley; Edward A. McDonald; Gene F. Young, both of Lexington; Craig A. Walrath, Easley; James M. Ottinger, Columbia, all of S.C.; Marti D. Miller, Hudwon, Wis.

[73] Assignee: NCR Corporation, Dayton, Ohio

[21] Appl. No.: 143,393

[22] Filed: Oct. 25, 1993

Related U.S. Application Data

[63] Continuation of Ser. No. 761,083, Sep. 17, 1991, abandoned.

[51] Int. Cl.6 .............................................. G06F 13/36
[52] U.S. Cl. .................................... 395/325; 395/725
[58] Field of Search ............... 395/325, 725, 275, 425

[56] References Cited

U.S. PATENT DOCUMENTS

| | | | |
|---|---|---|---|
| 4,041,472 | 8/1977 | Shah et al. | 395/325 |
| 4,231,086 | 10/1980 | Tarbox et al. | 395/325 |
| 4,649,471 | 3/1987 | Briggs et al. | 395/325 |
| 4,809,217 | 2/1989 | Floro et al. | 395/275 |
| 4,851,116 | 8/1989 | Gillett, Jr. et al. | 395/325 |
| 4,868,741 | 9/1989 | Gula et al. | 395/325 |
| 4,897,786 | 1/1990 | Pimm et al. | 395/325 |
| 4,897,833 | 1/1990 | Kent et al. | 370/85.2 |
| 4,955,018 | 9/1990 | Twitty et al. | 370/85.1 |
| 4,974,153 | 11/1990 | Pimm et al. | 395/325 |
| 5,067,071 | 11/1991 | Schanin et al. | 395/275 |
| 5,083,259 | 1/1992 | Maresh et al. | 395/325 |
| 5,088,028 | 2/1992 | Theus et al. | 395/325 |

FOREIGN PATENT DOCUMENTS 0184657 6/1986 European Pat. Off. .

*Primary Examiner*—Jack B. Harvey
*Assistant Examiner*—Glenn A. Auve
*Attorney, Agent, or Firm*—James M. Stover

[57] ABSTRACT

A retry scheme for optimizing use of a first bus in a computer system which includes a plurality of bus masters connected through the first bus to an interface circuit and second bus. The interface circuit includes logic for generating a busy signal when the second bus is in a busy state and logic for generating a retry signal when the interface circuit is addressed by a bus master while the second bus is in a busy state. Each bus master includes logic for receiving the retry signal and relinquishing control of the common bus upon receipt of the retry signal from the interface circuit. A bus arbiter includes logic for receiving the busy signal and preventing any bus master seeking access to the second bus from participating in arbitration for control of the common first bus until the busy signal has been negated. Thus, during the term of the busy signal the first bus may be controlled by any bus master not requiring access to the shared resource. Upon negation of the busy signal, all bus masters will be permitted to compete for ownership of the bus.

4 Claims, 4 Drawing Sheets

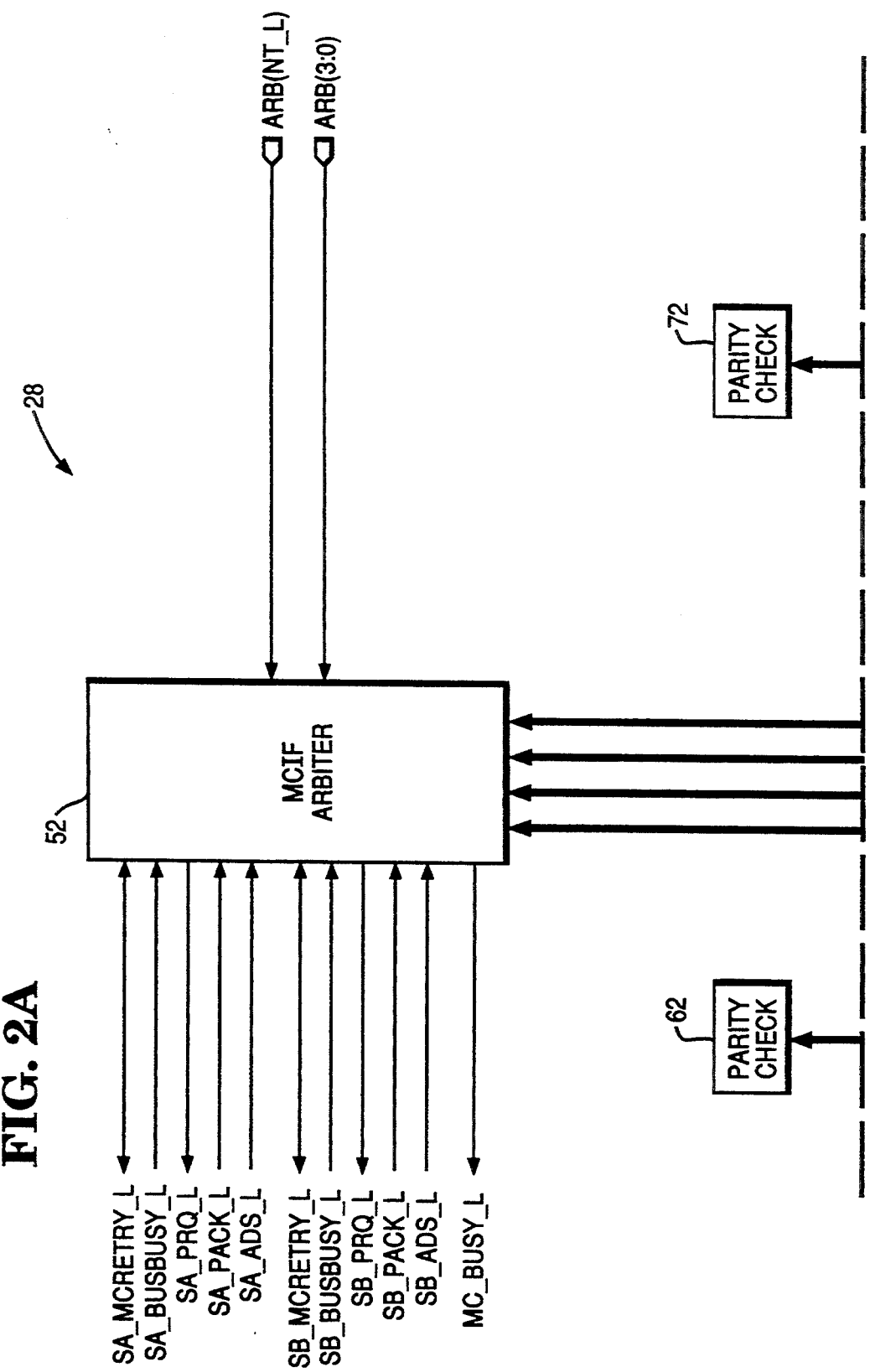

RETRY SCHEME FOR CONTROLLING TRANSACTIONS BETWEEN TWO BUSSES

This is a continuation of application Ser. No. 07/761,083, filed on Sep. 17, 1991, now abandoned.

The present invention relates to computer systems including multiple busses and, more particularly, to a retry scheme for eliminating deadlock on a first bus containing transactions directed to a second, unavailable, bus.

BACKGROUND OF THE INVENTION

NCR Corporation has developed a scalable computer system architecture providing more effective scaling of multiprocessor performance than conventional system architectures. The scalable system architecture recognizes and overcomes many limitations of conventional system architectures, such as degradation caused by multiple processors sharing memory and memory busses, and overhead penalties associated with memory/cache coherency.

Key characteristics of this new architecture includes: the use of multiple memory busses to reduce memory bus utilization and physical loading; the use of multi-ported memory to facilitate multiple busses and allow simultaneous use of different memory devices; the use of memory base coherency techniques that significantly reduce coherency overhead; and a symmetric view of system resources by all processors.

One implementation of this architecture employing dual system busses 12 and 14, two dual-ported system memory modules 16 and 18 connected between the two system busses, two processor modules 20 and 22 connected to bus 12, and two processor modules 24 and 26 connected to system bus 14 is shown in FIG. 1. Also shown in FIG. 1 are two Micro Channel input/output (I/O) busses 32 and 42 and interface modules 28 and 30 connecting respective I/O busses 32 and 42 with the system busses.

Each interface module provides a communication pathway between the bus masters residing on the system busses (i.e. memory modules 16 and 18 and processor modules 20, 22, 24 and 26) and the Micro Channel bus units residing on one I/O bus, identified by reference numerals 34, 36, 38, 40, 44, 46 and 48. Arbitration systems are employed to coordinate the use of system busses 12 and 14 and I/O busses 32 and 42. For example,, when a system bus master, such as processor 22, seeks write access to Micro Channel bus unit 36 on I/O bus 32, it must first arbitrate for use of system bus 12. Upon gaining control of bus 12, interface module 28 must then arbitrate for use of I/O bus 32. If I/O bus 32 is available, the request by processor 22 is service immediately.

During normal operation however, there will be times when I/O bus 32 is unavailable or "busy". For example, I/O bus 32 will be unavailable when (1) the bus is owned by one of bus units 34, 36, 38 or 40; (2) an access by a processor on system bus 14 to a bus unit residing on I/O bus 32 is being serviced; (3) a processor on system bus 14 is executing a locked sequence of cycles to an I/O bus 32 bus unit (semaphore operation); or (4) interface module 28 is servicing a previously posted (buffered) write to an I/O bus 32 bus unit by a processor on either system bus 12 or 14.

In a traditional system, once an access to a busy I/O resource is initiated, the target resource would keep the access in an indefinite wait state until the resource became available. Thus in the example above, processor 22, system bus 12 and interface module 28 would be kept in a wait state and unable to perform other transactions until I/O bus 32 became available. Processor 20 would also be prohibited from addressing memory module 16 and 18 and interface module 30. In addition, system deadlock could result in the event that one of processors 20 or 22 requests access to MC I/O bus 32 simultaneously with a request by a Micro Channel bus master for access to system bus 12.

OBJECTS OF THE INVENTION

It is therefore an object of the present invention to provide a new and useful method for increasing performance within a computer system including multiple busses.

It is another object of the present invention to provide such a method which eliminates deadlock on a first bus containing transactions directed to a second, unavailable, bus.

It is yet another object of the present invention to provide a new and useful interface between busses within a computer system.

It is still a further object of the present invention to provide such an interface which prevents a "busy" bus from causing deadlock on additional busses.

It is a further object of the present invention to provide logic for generating "busy" and "retry" signals for coordinating transactions between busses in a computer system to eliminate deadlock conditions on the busses.

It is an additional object of the present invention to provide a new and useful retry scheme for coordinating transactions between elements within a computer system.

SUMMARY OF THE INVENTION

There is provided, in accordance with the present invention, a method for optimizing use of a common bus in a computer system which includes a plurality of bus masters connected through the common bus to a shared resource, and further includes a bus arbiter for controlling bus master access to the common bus. The method incudes the steps of generating a busy signal whenever the shared resource is in an unavailable state; providing the busy signal to the bus arbiter; and preventing bus masters seeking access to the shared resource from participating in arbitration for control of the common bus during receipt of the busy signal by said arbiter. Thus, during the term of the busy signal the bus may be controlled by bus masters not requiring access to the shared resource. Upon negation of the busy signal, all bus masters will be permitted to compete for ownership of the bus.

In the described embodiment, the shared resource comprises an interface circuit connecting the common bus with a second bus. The interface circuit includes logic for generating a busy signal when the second bus is in a busy state and logic for generating a retry signal when the interface circuit is addressed by a bus master while the second bus is in a busy state. Each bus master includes logic for receiving the retry signal and relinquishing control of the common bus upon receipt of the retry signal from the interface ciruit. The bus arbiter includes logic for receiving the busy signal and preventing any bus master seeking access to the second bus from participating in arbitration for control of the common first bus until the busy signal has been negated.

BRIEF DESCRIPTION OF THE DRAWINGS

FIGS. 2A and 2B provide a block diagram representation of the addressing and arbitration logic included within Micro Channel interface module 28 of FIG. 1.

DETAILED DESCRIPTION OF THE PREFERRED EMBODIMENT

Figure 1:
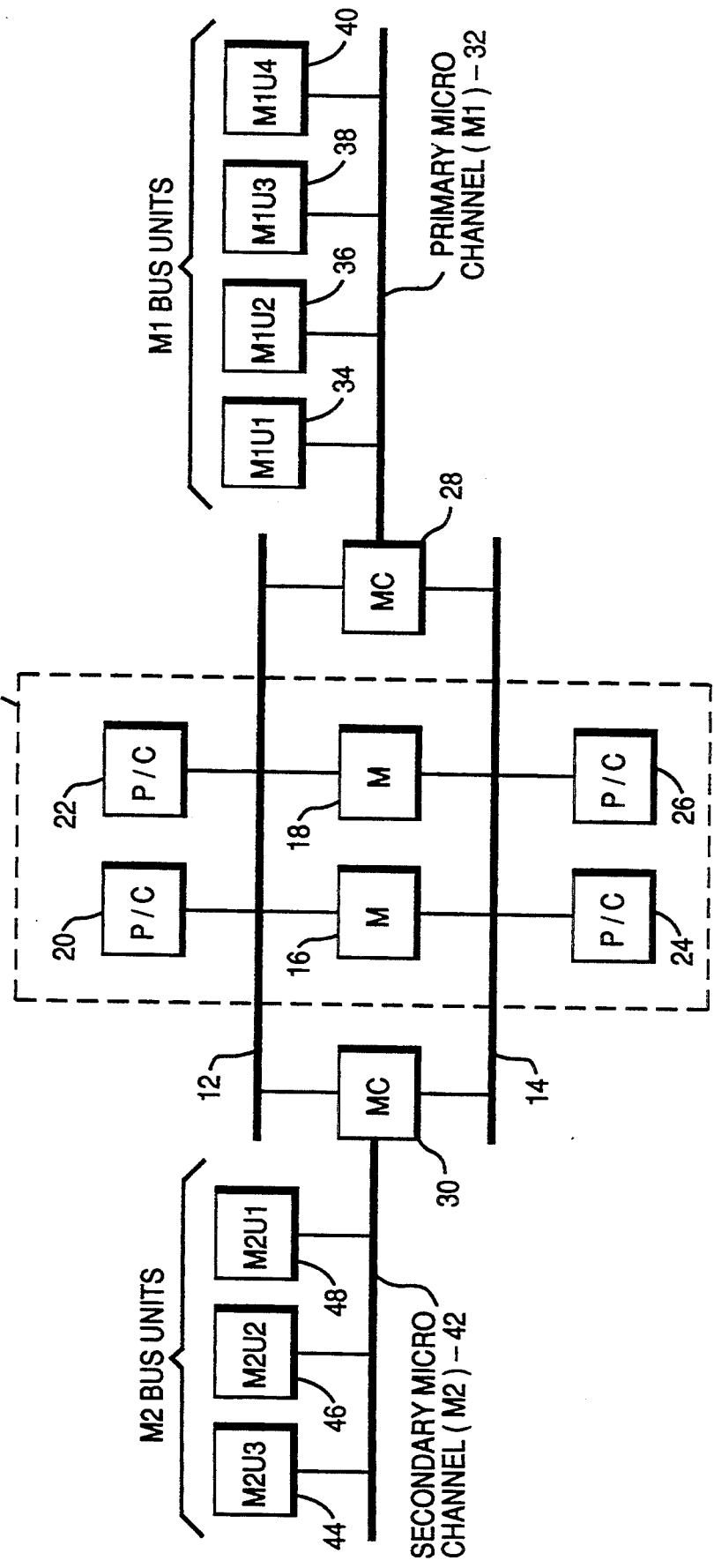
FIG. 1 is a block diagram representation of a scalable system architecture for a computer system.

One implementation of a scalable system architecture for a computer system is shown in the simple block diagram of FIG. 1. As implemented, the architecture comprises dual system busses 12 and 14, two dual-ported system memory modules 16 and 18 connected between the two system busses, two processor modules 20 and 22 connected to bus 12, and two processor modules 24 and 26 connected to system bus 16. Also connected between the system busses are Micro Channel interface modules 28 and 30.

Micro Channel interface module 28 provides connection between system busses 12 and 14 and primary Micro Channel I/O bus 32. Connected to bus 32 are various Micro Channel bus masters 34, 36, 38 and 40. Interface module 30 provides connection between system busses 12 and 14 and bus masters 34, 36, 38 residing on secondary Micro Channel I/O bus 42.

The discussion which follows refers to the structure and operation of MC interface module 28 and MC I/O bus 32. The construction and operation of MC interface module 30 and MC I/O bus 42 are identical to module 28 and bus 32, respectively.

Figure 2B:
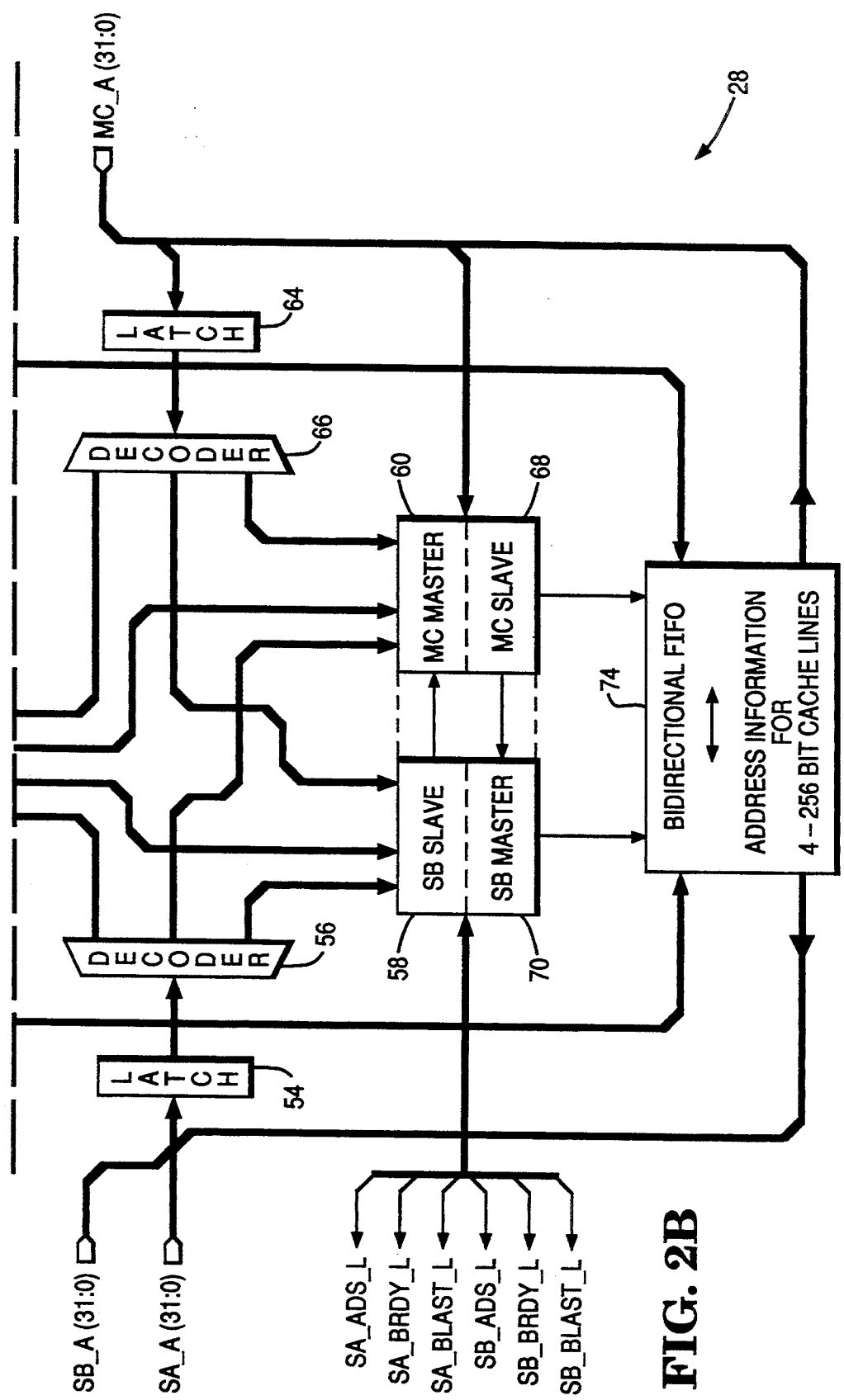

A block diagram representation of the addressing and arbitration logic included within Micro Channel (MC) interface module 28 is shown in FIGS. 2A and 2B. The interface module includes logic in addition to what is shown in FIGS. 2A and 2B which has been omitted to simplify the present discussion. The omitted logic is not necessary for an understanding of the present invention.

The logic blocks shown in FIG. 2 include an arbiter 52 (MCIF arbiter) which senses and drives MC I/O bus 32 arbitration signals ARB(3:0) and senses arbitration/grant indicator signal ARBGNTL. The MCIF arbiter must arbitrate for control of I/O bus 32 on behalf of a system bus master during requesting for access to the I/O bus. MCIF arbiter 52 also conducts system bus arbitration and cycle generation on behalf of MC bus masters requesting access to system resources.

Logic elements utilized during system bus initiated cycles propagated to the MC I/O bus include latch 54 which is used to latch address, address parity and bus operation signals received from system bus 12, i.e. signals SBA(31:0), or system bus 14, i.e signals SBB(31:0). The output of latch 54 is provided to a decoder 56 which detects whether or not the current cycle is directed to the MC I/O bus and generates start and decoded address signals for system bus slave module 58.

System bus slave module 58 controls the multiplexing of system bus address information to I/O bus 32, coordinates system bus data transfer activities, and controls the starting of MC bus master module 60. Upon receiving a start signal from module 58, MC bus master module 60 generates cycles on MC I/O bus 32 in accordance with the Micro Channel Architecture specification and coordinates MC I/O bus data transfer activities.

Logic elements utilized during MC I/O bus initiated cycles propagated to the system bus include latch 6.4, decoder 66, MC slave module 68, SB master module 70, and address FIFO 74. When MC interface module 28 is a slave on MC I/O bus 32, MC address MCA(31:0) is held within latch 64 to be propagated to decoder 66. Decoder 66 is responsible for decoding of MC cycles directed to the system busses and determining whether the system bus directed cycles are to be decoupled to allow write posting and read-ahead address information into address FIFO 74.

MC bus slave module 68 senses the MC bus signals received from decoder 66 to latch the current address, initiate propagation of the MC cycle to a selected system bus and coordinate MC I/O bus data transfer activity.

The system bus master module requests a system bus on behalf of a MC bus master and controls the system signals when MC interface module 28 is a system bus master on either one of system busses 12 or 14. System bus master module 70 communicates with address FIFO 74 and coordinates system bus transfer activities.

Interface module 28 provides buffering and decoupling between the system busses and the I/O bus 32. Buffering at the interface module boosts total system bandwidth by allowing bus masters on both the system busses and I/O bus 32 to concurrently operate at their peak rates.

Decoupling the system busses from the Micro Channel I/O busses allows higher performance on all busses and concurrency between busses. Each bus operates independently to conduct transactions between bus units residing on the bus. Connections between the busses are made only when a bus master on one bus requires access to a resource residing on another bus, such as when processor 22 requests access to MC bus unit 36, or when a bus unit residing on I/O bus 32 requests access to system memory.

To prevent deadlock on either system bus when a bus master on the system bus requests access to a bus unit on a busy I/O bus 32, interface module 28 includes logic for generating a retry signal which causes the requesting bus master to release the system bus and arbitrate for control of the system and I/O buses again when I/O bus 32 is available. Arbitration for the system bus is controlled by a system bus arbiter (not shown). Listed below are some of the signals driven by the system bus arbiter, the MC interface and other bus units residing on the system bus to coordinate use of the system bus.

| Signal | Description |
| --- | --- |
| ADS_L | Address Strobe - Indicates the start of a bus cycle. |
| BRDY_L | Burst Ready - On read cycles, driven by the current system bus slave to indicate it has driven valid read data onto the system bus. On wlite cycles, driven by the slave to end the current cycle. |
| BLAST_L | Burst Last - Activated by a master to indicate to a slave the end of a burst bus sequence. |
| BUSBUSY_L | Bus Busy - Dziven by the system bus arbiter to indicate the system bus is in use. |
| PRQ_L | Driven low by a bus master or the MC interface to request ownership |

| Signal | Description |
|---|---|
| | of the system bus. |
| PACK_L | Driven low by the system bus arbiter to indicate to a bus master that its request for the system bus has been granted. |

FIGS. 2A and 2B show each of the above-described active-low signals in duplicate, preceeded by the nomenclature SA or SB. Signals preceeded by SA are associated with system bus 12 while signals beginning with SB are associated with system bus 14. To prevent deadlock on the system bus, interface module 28 generates retry signals SAMCRETRYL and SBMCRETRYL and a Micro Channel bus busy signal MCBUSYL, as described below.

| Signal | Description |
|---|---|
| SA_MCRETRY_L | Micro Channel Interface Retry - Driven by the MC Interface to terminate a cycle attempted to a busy MC I/O bus. |
| SB_MCRETRY_L | Micro Channel Interface Retry - Driven by the MC Interface to terminate a cycle attempted to a busy MC I/O bus. |
| MC_BUSY_L | Micro Channel Bus Busy - Driven by the MC interface to indicate that the MC bus is not available for new bus master ownership. |

The applicable MCRETRYL signal is driven low by the MC interface if a system bus master requests access to the MC I/O bus when in a busy state. In response to this signal, the requesting system bus master will release the system bus and re-arbitrate for the system bus until access is granted by the system bus arbiter. Upon sensing of an active MCRETRYL signal, the system bus arbiter will not allow the system bus master requesting ownership of the MC I/O bus to gain control of the system bus until the MC interface has signaled the system bus arbiter that the MC I/O bus is available by driving the MCBUSYL signal high. MCBUSYL is driven low by the MC interface when the MC I/O bus is not available for new bus master ownership.

Figure 3:
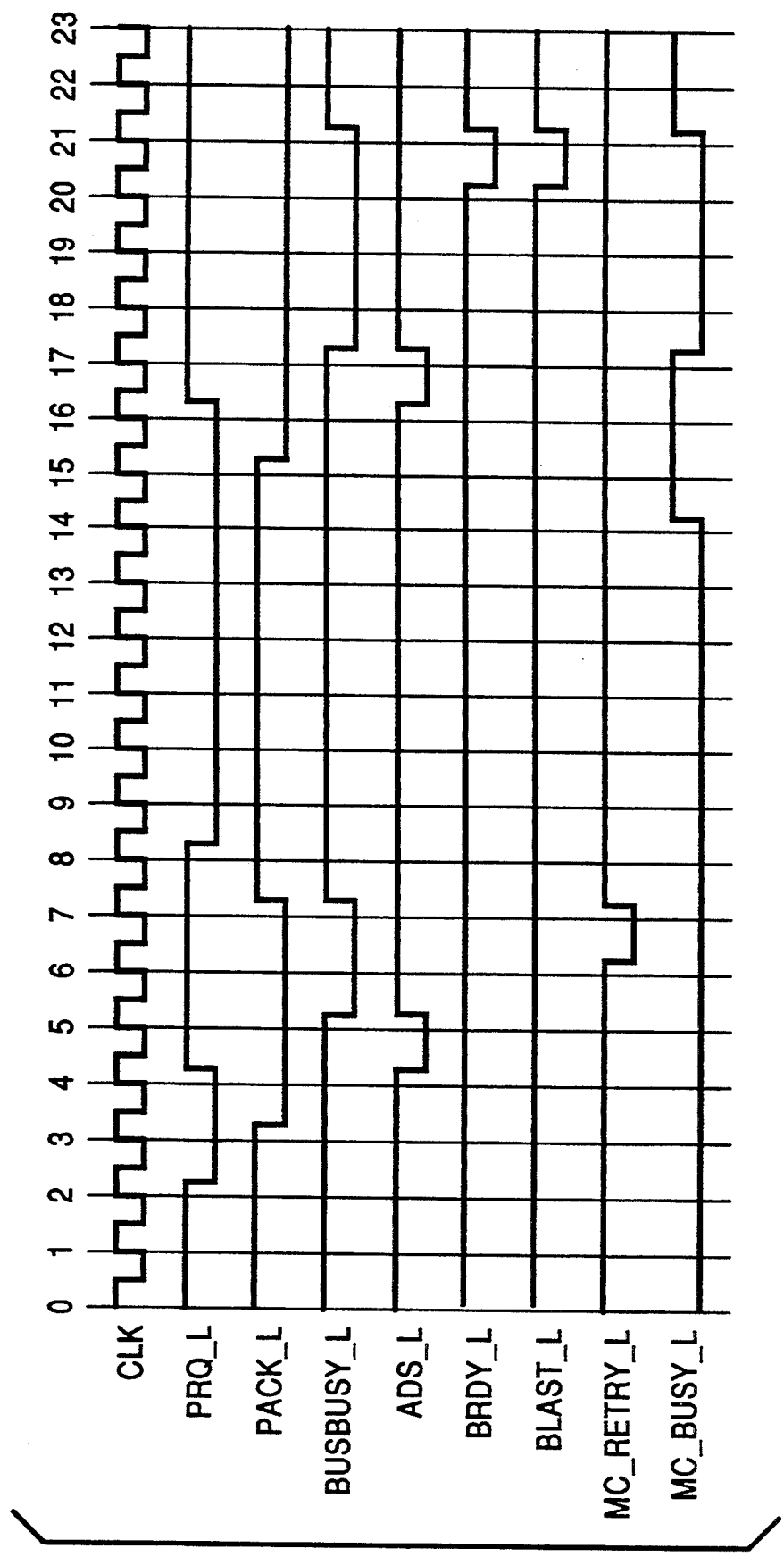
FIG. 3 is a timing diagram for a retry scheme in accordance with the present invention.

FIG. 3 provides an example timing diagram illustrating the sequence of events which occur when processor 22 seeks access to an unavailable I/O bus 32. The initial state of MCBUSYL is low indicating that MC I/O bus is not available for new bus master ownership. The timing for the retry sequence shown in FIG. 3 is set forth below.

| | |
|---|---|
| Clock 2-3 | Processor 22 arbitrates for system bus 12. PRQ_L driven low by processor 22 to request system bus. PACK_L driven low by system bus arbiter granting bus ownership to processor 22. |
| Clock 4 | Processor 22 addresses MC interface 28. |
| Clock 6 | Instead of BRDY_L, MC interface 28 asserts SA_MCRETRY_L. |
| Clock 7 | Processor 22 detects SA_MCRETRY_L and releases bus 12. |
| Clock 8 | Processor 22 again requests control of bus 12. |
| Clock 9-13 | The system bus arbiter ignores the request by processor 22 for bus 12. The arbiter knows through receipt of signal SA_MCRETRY_L that processor 22 will address interface 28 if given-control of bus 12. Processor 20 and interface modules 28 and 30 are permitted control of bus 12 for access to memory modules 16 and 18 or other devices residing on the bus. |
| Clock 14 | I/O bus 32 is no longer busy.. Interface 28 negates (drives high) signal MC_BUSY_L. |
| Clock 15 | The system bus arbiter detects MC_BUSY_L, and asserts PACK_L. |
| Clock 16-20 | Processor 22 successfully accesses interface 28. |

It can thus be seen that there has been provided by the present invention a simple solution for eliminating deadlock on a first bus containing transactions directed to a second, unavailable, bus.

Although the presently preferred embodiment of the invention has been described, it will be understood that various changes may be made within the scope of the appended claims.

What is claimed is:

1. In a computer system including a plurality of bus masters connected a common bus, a shared resource connected to said common bus, said shared resource having available and unavailable states, and a bus arbiter for controlling bus master access to said common bus, a method for optimizing use of said common bus, comprising the steps of:

sensing the state of said shared resource;

generating a retry signal when a first one of said plurality of bus masters gaining control of said common bus addresses said shared resource while said shared resource is in an unavailable state;

providing said retry signal to said first bus master, said first bus master relinquishing control of said common bus upon receipt of said retry signal;

identifying said first bus master to said arbiter; and generating a busy signal as long as said shared resource is unavailable and providing said busy signal to said bus arbiter, said arbiter preventing said first bus master from arbitrating for control of said common bus during receipt of said busy signal.

2. The method according to claim 1, further including the step of:

granting said first bus master control of said bus upon the expiration of said busy signal.

3. In a computer system including a plurality of bus masters connected to a first bus, a bus arbiter for controlling bus master access to said first bus, and an interface circuit providing coupling between said first bus and a second bus, apparatus comprising:

logic within said interface circuit for generating a busy signal whenever said second bus is in a busy state, said busy signal being provided to said bus arbiter; and logic within said arbiter for preventing bus masters that are seeking control of said first bus to access said interface unit and said second bus from participating in arbitration for control of said first bus during receipt of said busy signal.

4. In a computer system including a first bus, a second bus, and a plurality of bus masters coupled to said first bus, apparatus comprising:

an interface circuit connecting said first and second busses, said interface circuit including:

logic for generating a busy signal when said second bus is in a busy state;

logic for generating a retry signal when said interface circuit is addressed by one of said plurality of bus masters seeking access to said second bus while said second bus is in a busy state, said retry signal being simultaneously provided to each one of said plurality of bus masters;

logic within each one of said plurality of bus masters for receiving said retry signal and relinquishing control of said first bus in response thereto; and an arbiter for controlling use of said first bus, said arbiter including:

logic for receiving said busy signal and preventing said bus master seeking access to said second bus from participating in arbitration for control of said first bus during receipt of said busy signal;

whereby bus masters not seeking access to said second bus are not blocked from arbitrating for control of said first bus during receipt of said busy signal by said arbiter.

* * * * *